C. F. MOORE.
AUTOMATIC SHUT-OFF WATER GLASS.
APPLICATION FILED JULY 9, 1909.
952,833.
Patented Mar. 22, 1910.
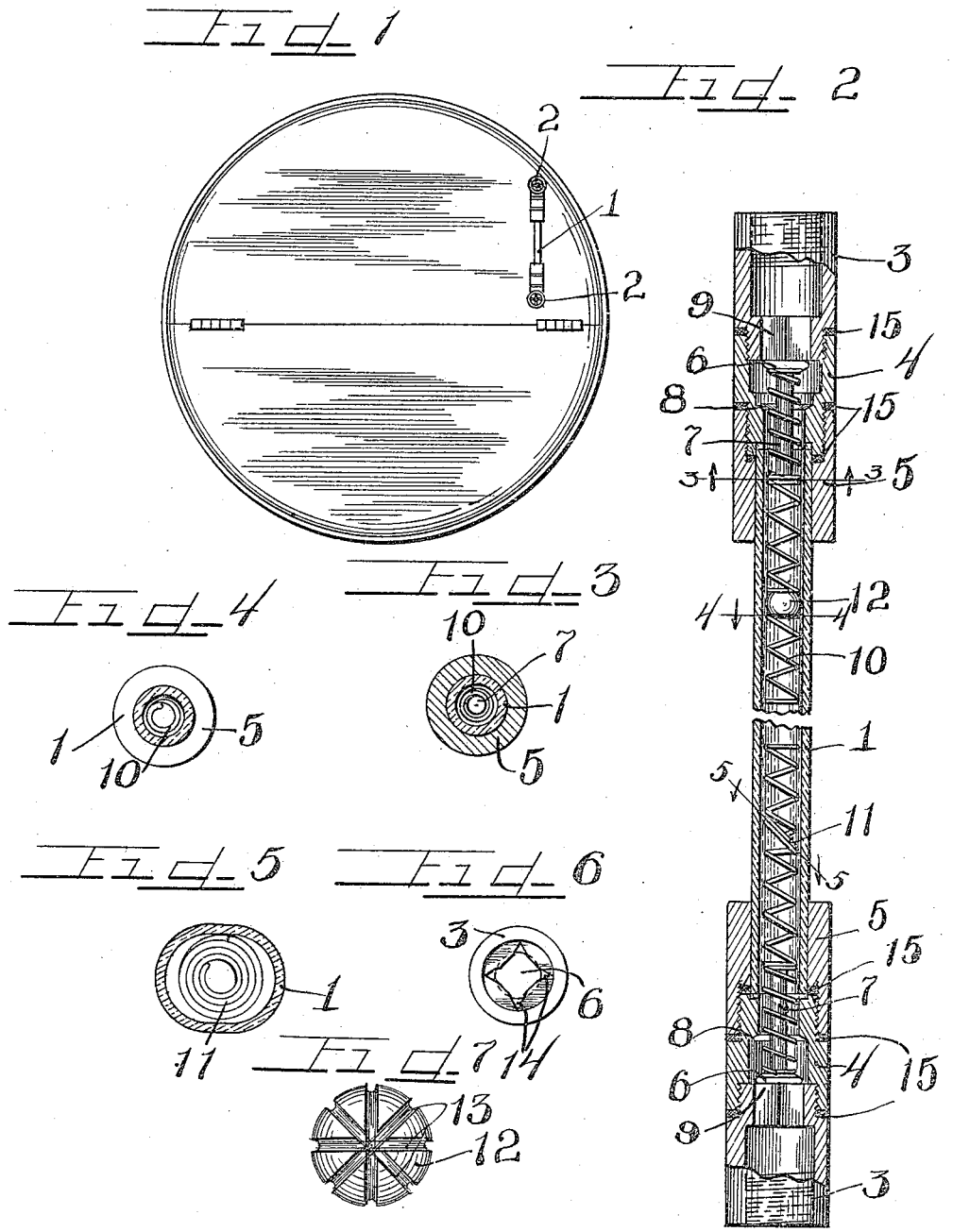

UNITED STATES PATENT OFFICE.

CLEMENT FRANCIS MOORE, OF CHICAGO, ILLINOIS.

AUTOMATIC-SHUT-OFF WATER-GLASS.

952,833.   Specification of Letters Patent.   Patented Mar. 22, 1910.

Application filed July 2, 1909.   Serial No. 506,781.

*To all whom it may concern:*

Be it known that I, CLEMENT FRANCIS MOORE, a citizen of the United States, residing at Chicago, in the county of Cook and the State of Illinois, with a post-office address at 541 Ogden avenue, have invented a new and useful Improvement in Automatic-Shut-Off Water-Glasses for Boilers, of which the following is a specification.

My invention relates to glasses that indicate the height of water or other fluid in boilers or other vessels.

The object of my invention is to produce a device that is practicable and cheap that will automatically shut off the water or fluid when the glass becomes broken.

Reference will be had to the accompanying drawings wherein—

Figure 1 is a front view of a boiler head showing the ordinary position of such glasses. Fig. 2 is a vertical sectional view of the entire device. Fig. 3 is a cross section on a line 3—3 of Fig. 2. Fig. 4 is a sectional view through the glass at any midway position as on line 4—4, Fig. 2. Fig. 5 is a section on line 5—5 of Fig. 2. Fig. 6 is an end view of piece 3. Fig. 7 is a view of one of the balls used in the device.

In the drawing 1 indicates the ordinary glass tube or water glass of a boiler.

2 indicates the ordinary water glass fixtures provided with hand valves for shutting the connections to the boiler.

3 indicates the connections of my device that connect to the ordinary connections 2.

4 indicates valve seat pieces that connect to 3, and 5 indicates the connections that join the glass 1 at each end of the device.

The parts 3, 4 and 5 are connected by suitable threaded nipples as shown with shoulders for suitable gaskets 15. In the valve seat pieces 4, there are valves of any suitable construction but I prefer to use ordinary disk valves 6 having stems 7, the valve disks seating upon the seats 8, when the glass is broken but when the glass is in order the valve disks 6 are held up against the ends 9 of pieces 3 by springs 10, extending through the entire glass and abutting against the valve disks, thus the valves 6 are normally held open at all times when the device is in order with the glass intact. The springs 10 are made in short pieces as is shown and they slide freely within the glass and are abutted against each other in such a way that they require the guidance or support of the glass to keep them in line in order to hold the valve disks apart or up off from their seats, but should this support by the glass cease for any short distance by the breaking of the glass the springs will spring out of line or slip out of engagement with each other and then permit the valve disks to be carried by gravity or by the escaping water or steam or other fluid to their seats and thereby close automatically the passage-ways from the boiler.

The arrangement of the springs to bring about their dislocation at the time of the breaking of the glass is provided for in any suitable manner but I prefer to use two methods, one of them being to construct the springs with beveled ends as shown at 11 and the other is to place balls 12 in between the ends of the springs. In case of the use of the balls the balls are so constructed that they permit water or steam to pass, and for illustration they are shown as provided with grooves 13, as an example of means to this end.

The ends 9 are provided with apertures 14 extending outside the peripheries of the valves so that when the latter are held against these ends, the passageways are not closed.

Heretofore in the use of water glasses without an automatic safety shut-off, the breaking of a glass often caused serious loss for it is dangerous and sometimes almost impossible to shut the hand valves owing to the escaping steam and hot water under pressure, and to do this sometimes requires the blowing off of the boiler and the shutting down of the plant. But with my device no serious damage or delay results as it automatically closes the escape from the boiler and the new glass may be put in by simply shutting the hand valves and having access to the parts regardless of the pressure on the boiler.

What I claim is:

1. In apparatus of the class described, the combination with a water glass, of valves at its ends, respectively, springs alined in the tube and normally holding said valves open, and means whereby the elastic force of the springs presses them out of alinement, allowing the valves to shut, when the glass is broken.

2. In apparatus of the class described, the combination with a water glass, of two valves at the ends of the glass, respectively, a series of longitudinally compressed, alined springs within the glass and normally holding the valves open, and means for causing two abutting ends of said springs to disengage upon the breaking of the glass.

3. In apparatus of the class described the combination with a water glass, of valves at the ends of the glass, respectively, and a series of longitudinally compressed springs in the glass, normally supported in line thereby and holding the valves open, two meeting ends of said springs being inclined whereby they tend to push each other aside and pass out of engagement when the glass is broken.

4. In apparatus of the class described, the combination with a water glass tube, of valves at the ends, respectively, of the tube and adapted to close the passages thereto, springs extending through and normally held in line by the glass and normally holding the valves open, and a ball between two adjacent ends of two spring sections, whereby the springs are easily thrown out of alinement by their own elastic force when the glass is broken.

5. In apparatus of the class described, the combination with a water glass, of valves at the ends, respectively, of said glass a series of distinct abutting springs extending through the glass and normally holding the valves open, and a ball interposed between the adjacent ends of two spring sections, two other meeting ends of the sections being beveled, whereby the breaking of the glass permits the elastic force of the springs to throw them out of alinement and release the open valves.

Chicago July 2nd 1909.

CLEMENT FRANCIS MOORE.

Witnesses:
R. ROPER,
JOHN GRANT.